(12) United States Patent
Weber et al.

(10) Patent No.: US 6,212,610 B1
(45) Date of Patent: *Apr. 3, 2001

(54) MEMORY PROTECTION MECHANISM FOR A DISTRIBUTED SHARED MEMORY MULTIPROCESSOR WITH INTEGRATED MESSAGE PASSING SUPPORT

(75) Inventors: Wolf-Dietrich Weber, La Honda; Jaspal Kohli, Sunnyvale, both of CA (US)

(73) Assignee: Fujitsu Limited (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/003,771

(22) Filed: Jan. 7, 1998

(51) Int. Cl.[7] ............................ G06F 15/16; G06F 15/163
(52) U.S. Cl. ...................... 711/164; 711/100; 711/144; 711/152; 709/213; 709/229; 710/200; 710/240
(58) Field of Search .................................. 711/100, 118, 711/144, 145, 152, 153, 164; 709/213, 214, 215, 216, 229; 710/200, 240, 241, 242, 243, 244

(56) References Cited

U.S. PATENT DOCUMENTS

| | | |
|---|---|---|
| 5,197,141 * | 3/1993 | Ito . |
| 5,432,929 * | 7/1995 | Escola et al. . |
| 5,448,698 * | 9/1995 | Wilkes ............................ 395/200.01 |
| 5,450,563 * | 9/1995 | Gregor ................................. 395/403 |
| 5,590,309 * | 12/1996 | Chencinski et al. ................. 395/472 |
| 5,724,551 * | 3/1998 | Greenstein et al. ................. 395/491 |
| 5,809,546 * | 9/1998 | Greenstein et al. ................. 711/164 |
| 6,009,427 * | 12/1999 | Wolff . |

FOREIGN PATENT DOCUMENTS

| | | |
|---|---|---|
| 0489583 | 6/1992 | (EP) . |
| 0801349 | 10/1997 | (EP) . |

* cited by examiner

Primary Examiner—Robert B. Harrell
Assistant Examiner—Stephan Willett
(74) Attorney, Agent, or Firm—Carr & Ferrell LLP

(57) ABSTRACT

The present invention relates generally to efficient message passing support and memory access protections in scalable shared memory multiprocessing computer systems. In a multiprocessor system, processors need to communicate with one another to coordinate their work. Prior art multiprocessors only permit message passing or unprotected direct memory access. The present invention allows direct memory access with protection. The mechanism of the present invention permits processors to directly access each other's memory while retaining protection against faulty software or hardware. Security in the face of malicious intent of the communicating software is not maintained in the preferred embodiment, although a variation of the mechanism provides additional protection against malicious software albeit at the expense of slightly more complex hardware.

15 Claims, 5 Drawing Sheets

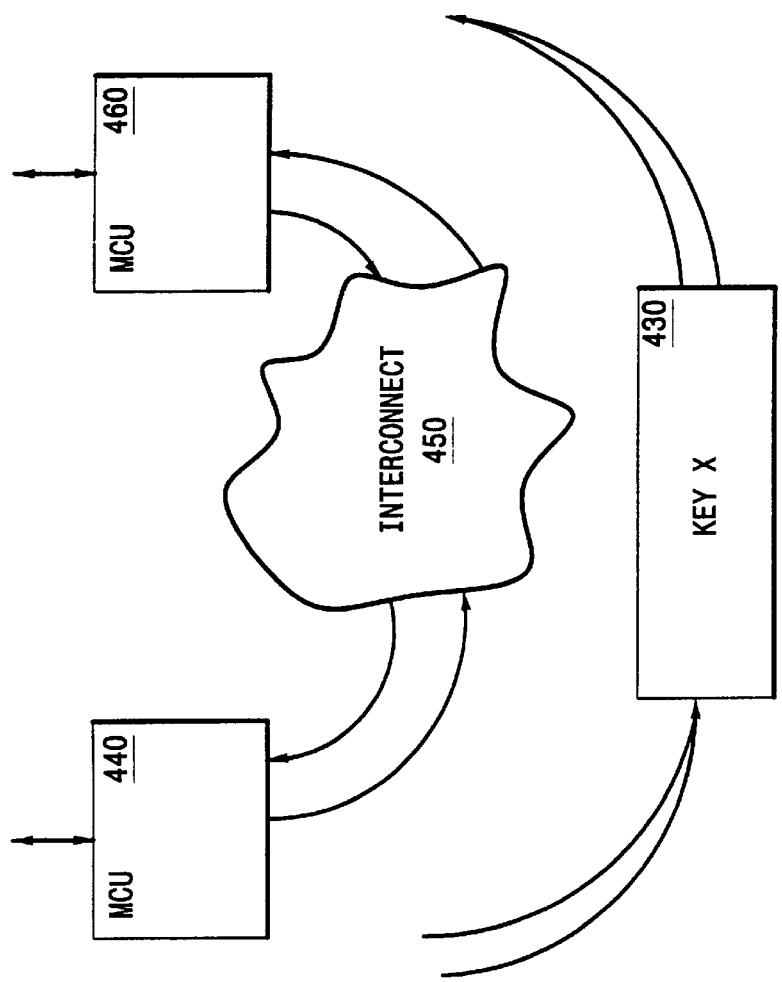
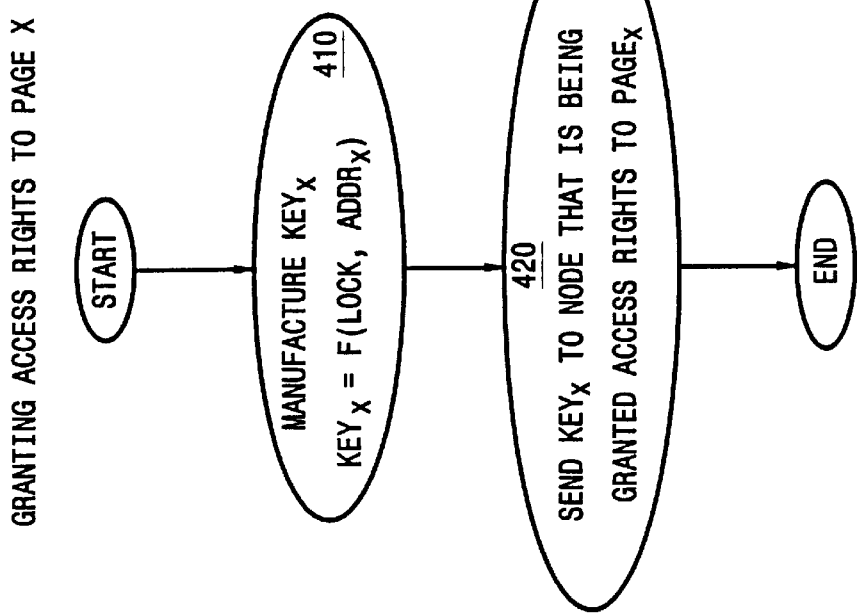
FIG. 4B
FIG. 4A

MEMORY PROTECTION MECHANISM FOR A DISTRIBUTED SHARED MEMORY MULTIPROCESSOR WITH INTEGRATED MESSAGE PASSING SUPPORT

CROSS-REFERENCE TO CO-PENDING APPLICATION

This application is related to co-pending application Ser. No. 09/003,721, filed Jan. 7, 1998, entitled, "Cache Coherence Unit With Integrated Message Passing and Memory Protection for a Distributed, Shared Memory Multiprocessor System," by inventor Wolf-Dietrich Weber, to common assignee.

BACKGROUND OF THE INVENTION

1. Field of the Invention

The present invention relates generally to computer communication protocols, and more specifically to a message passing protocol which is integrated with a cache coherence protocol in a multiprocessing computer system.

2. Discussion of Background Art

Multiprocessor data computer systems consist of a plurality of processor nodes communicating over a high-speed interconnection network. Each processor node typically includes a processor and local Random Access Memory (RAM). A computational problem is divided among processor nodes so that the utilization of particular resources available at different processor nodes is maximized. Dividing the problem among processor nodes also reduces the time needed to produce a result and thereby expedites the computation. However, this division of labor necessarily implies that a process running on one processor node may depend on the results of computations being performed at another processor node. The various processes then must communicate over the interconnection network to exchange information relevant to their particular problems, and must also synchronize the processes.

The performance level of a multiprocessor system depends on the speed with which processors can communicate with one another. In the sharedmemory paradigm, communication is very fast because each processor can simply read what the other processors have written. However, this model does not offer communicating processes any protection from interfering with one another by inadvertently overwriting each other's critical memory areas. In the message-passing model, on the other hand, each processor can only access its own memory and can only communicate with other processors by explicitly building up a message and sending it to the other processor. This model offers the communicating processors protection from one another, because they cannot write to each other's memory. However, this model is also inefficient because typically the operating system must be invoked on both sides of the transfer (sender and receiver). These operating system calls slow communication between the processors. It is thus desirable to allow communicating processes access to designated areas in each other's memory directly but at the same time protecting against inadvertent accesses to other areas of memory, all without the need for operating system intervention on the receiving side.

A mechanism that allows one processor to protect itself from having another processor corrupt its memory inadvertently due to a hardware or software fault is disclosed in U.S. Pat. No. 5,448,698, issued Sep. 5, 1995 to Wilkes. The Wilkes protection-check mechanism uses a protection table at the target that specifies a key for a number of memory areas. The mechanism disclosed in the Wilkes patent has the disadvantage that a table must be built into the hardware and requires storage space that inherently contains only a limited number of entries.

SUMMARY OF THE INVENTION

The present invention resides in a computer system having a plurality of processor nodes and an interconnection. Each processor node is connected to the interconnection and has a memory and a memory bus connected to the memory. Each processor node has a plurality of processors and each processor has a cache. The computer system has a mesh coherence unit for controlling messages and memory access requests between the memory bus and the interconnection. The computer system has a lock and key mechanism wherein a processor node having its memory accessed retains a lock value to compute, by a function from a memory address, a key value and a temp value, and a processor node requesting a memory access is permitted memory access when the temp value matches the key value.

One object of the present invention is to provide a message passing system where operating system calls are not required on the target side.

Another object is to provide protection for processes running at different processor nodes to protect each process from damage.

Still another object is to avoid the use of a table that requires additional hardware and storage space, and which inherently can contain only a limited number of tabular entries.

These and other objects of the present invention will become apparent to those skilled in the art from the following detailed description of the invention and the accompanying drawings.

BRIEF DESCRIPTION OF THE DRAWINGS

FIG. 4A and FIG. 4B show one embodiment for granting access rights to page x for an initiator node by the target node making key x.

DETAILED DESCRIPTION OF THE PREFERRED EMBODIMENT

The present invention resides in a system and method for a communication protocol in scalable shared-memory multiprocessing computer systems. A scalable shared-memory multiprocessing computer system has a plurality of processors connected to an interconnection over which the processors communicate with each other. The conventional mechanism by which a message is passed is via an input/output channel and an interconnection.

In a system with the present invention, the same communication channel is used for both cache coherence and message passing, which significantly increases the rate at which messages are exchanged. Each processor communicates with processors in other processor nodes by sending and receiving messages using a message-passing protocol that is tightly integrated with an inter-processor node cache coherence protocol. At the same time, a lock and key mechanism raises protection barriers between processor nodes that communicate only via message passing. In contrast to the prior art Wilkes device, supra, the present invention requires very little hardware storage and can cover an unlimited number of memory areas.

Figure 1:
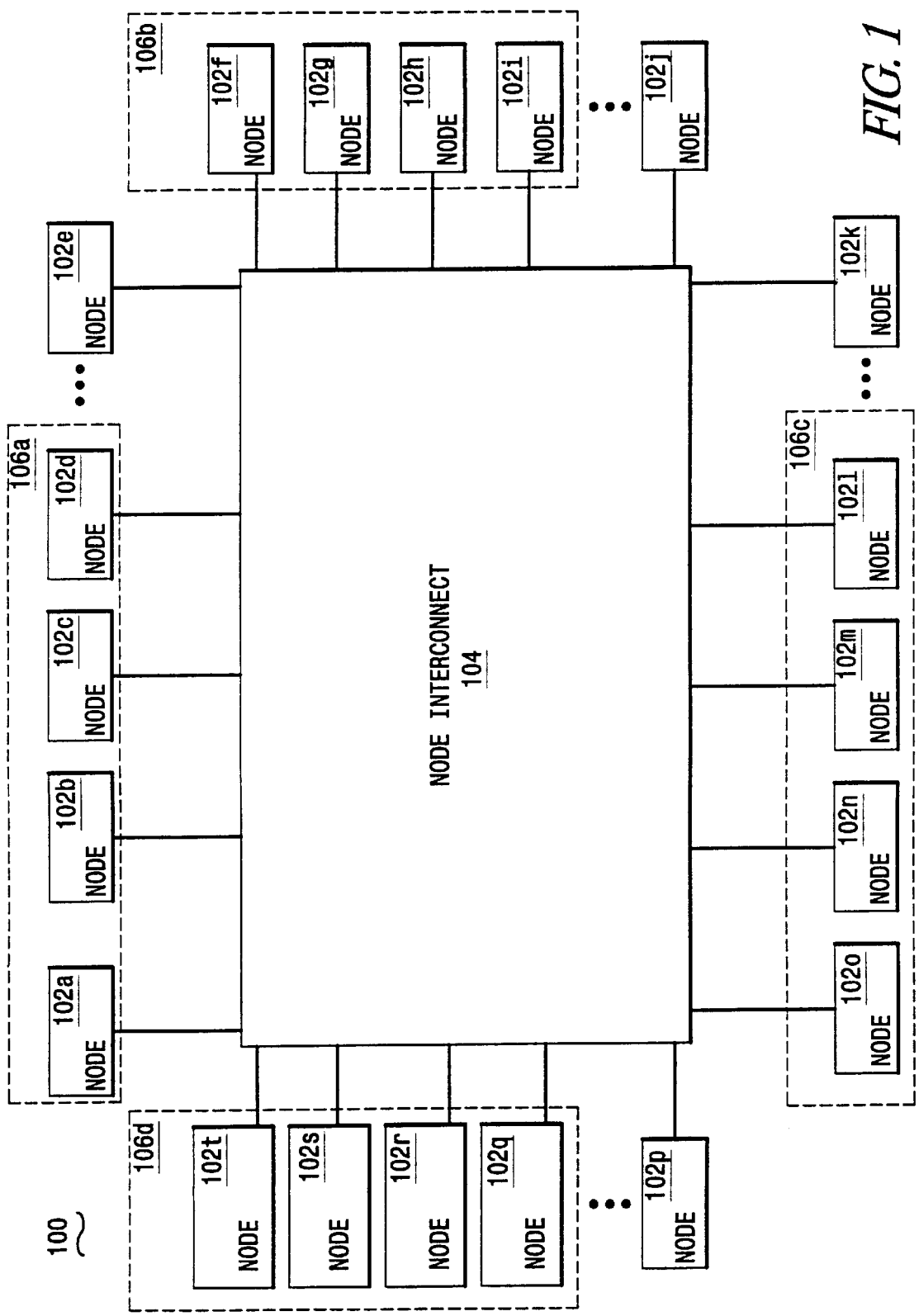
FIG. 1 is a functional block diagram of a computer system of the present invention having multiple processor nodes.

FIG. 1 is a functional block diagram of a computer system 100 according to the invention, including multiple processor nodes 102a–t and a processor node interconnection 104 which provides point-to-point communication between the nodes 102a–t. Each of the processor nodes 102a–t may be configured as a stand-alone computer system or associated with other processor nodes to share memory. The term "site" is used to designate a group of processor nodes sharing a physical address space in memory. Selected processor nodes 102a–d, 102f–i, 102l–o, and 102q–t are respectively configured as sites 106a, 106b, 106c and 106d. Other processor nodes 102e, 102j, 102k, and 102p are also connected via interconnection 104, but do not share memory and thus are not common sites. Such processor nodes in different sites communicate via message passing. For example, processor nodes in site 106a communicate with processor nodes in other sites, e.g., processor node 102n in site 106c, by sending messages via interconnection 104.

Figure 2:
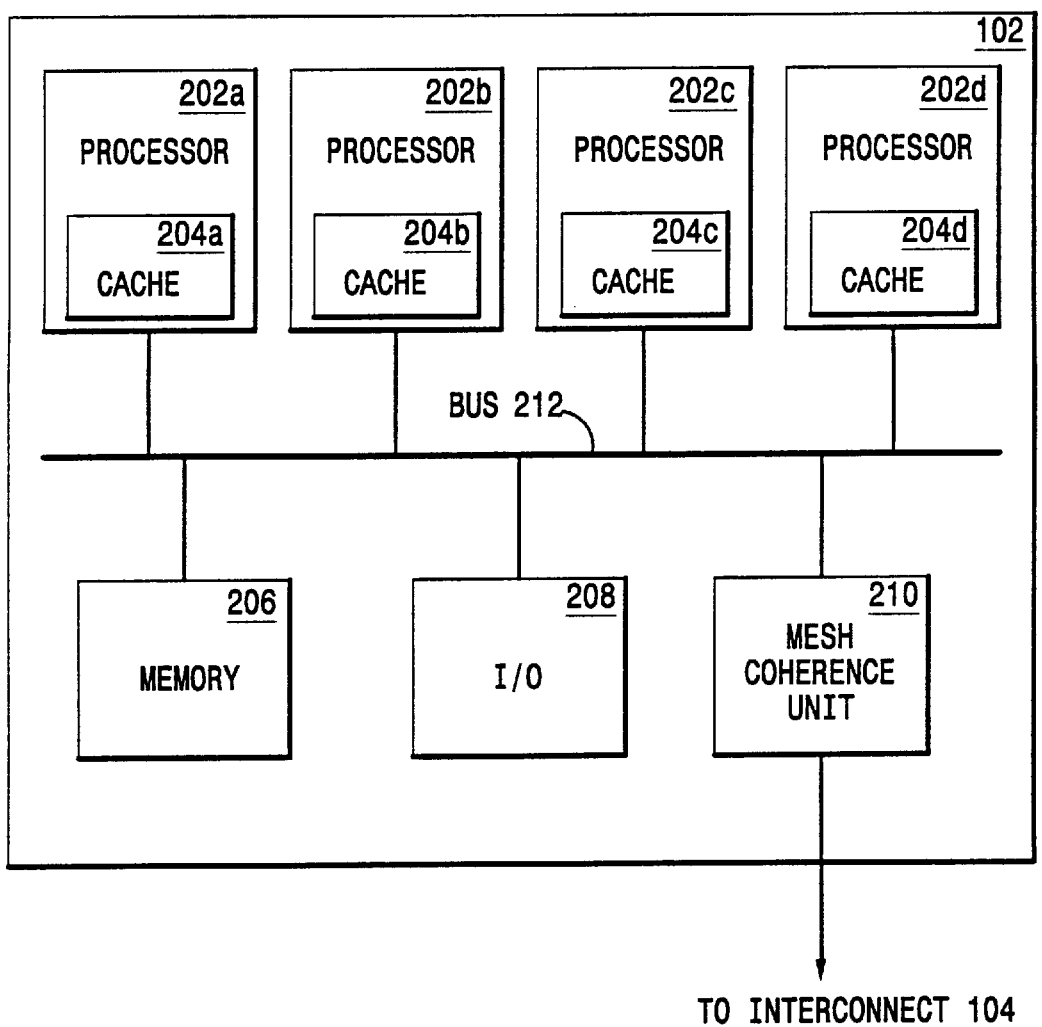
FIG. 2 is a functional block diagram of a processor node of FIG. 1.

The present invention achieves cache coherence with integrated message passing between processor nodes 102a–t, as shown in exemplary system 100 (FIG. 1). The processor nodes in a site, e.g., processor nodes 102a–d in site 106a, share a physical address memory space. In addition, each of the processor nodes has multiple processors 202a–d with a respective cache memory 204a–d (FIG. 2). Thus, cache coherence needs be maintained between caches 204a–d of processors 202a–d not only within a node 102, but also in different processor nodes 102a–d. For example, caches in node 102a must be coherent with caches in nodes 102b–d.

The invention further includes a memory protection mechanism. The memory protection mechanism permits access to a shared physical address space for processor nodes within a site 106a–d and denies access to the shared physical address space for processor nodes 102a–t outside the site 106a–d. For example, processor node 102e may pass messages to processor node 102a. However, because processor node 102e is not within site 106a, processor node 102e may not perform memory access operations on the physical address space of site 106a.

FIG. 2 is a functional block diagram of a processor node 102. Processor node 102 is exemplary of FIG. 1 processor nodes 102a–t and includes processors 202a–d each having a respective cache 204a–d, a memory subsystem 206, an input/output subsystem 208, and a mesh coherence unit (MCU) 210. Each of the functional units 202a–d, 206, 208, and 210 are connected to bus 212 for transmitting control, address, and data signals between the units. The mesh coherence unit 210 is connected to interconnection 104.

Processors 202a–d, memory subsystem 206, input/output subsystem 208, and bus 212 are commercially available, with one or more processors per node. The mesh coherence unit 210 coordinates inter-processor node cache coherence, inter-processor node message passing, and inter-processor node memory protection.

In a multiprocessor system, different processors typically must communicate with one another to co-ordinate their work. In order to limit the possibility of faulty software or hardware of one processor from corrupting another processor, and/or in order to enforce access security between different processors, some multiprocessors do not permit one processor to read directly from or to write directly to the memory of another processor. Instead, these multiprocessors only allow processors to exchange messages. Unlike a direct memory access, a message has to be processed and screened by the receiving processor, and hence this type of communication is typically less efficient.

The mechanism of the present invention permits processors to access each other's memory directly while permitting processors to retain protection against faulty software or hardware. However, this mechanism does not offer security against malicious intent of the communicating software. In another embodiment, the mechanism provides protection against malicious software, but requires slightly more complex hardware.

The mechanism relies on a lock and key scenario. The processor node that is performing an access (the "initiator" node) uses a key, while the processor node being accessed (the "target" node) keeps a lock. Each target generates a large number serving as the lock. This number is stored in hardware that does not accept memory access requests from other processor nodes.

Figure 3B:
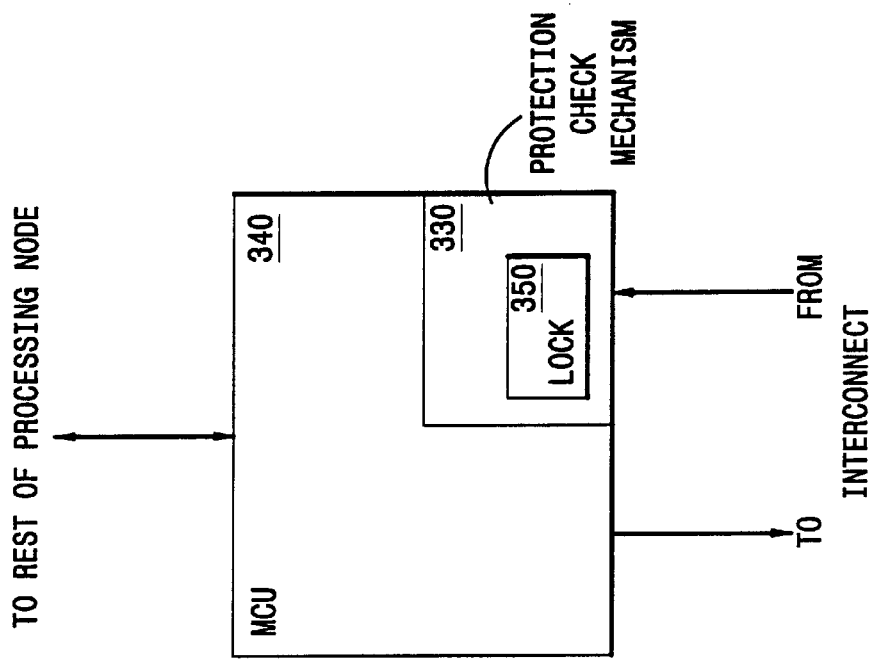
FIG. 3A and FIG. 3B show one embodiment for setting up a lock.
Figure 3A:
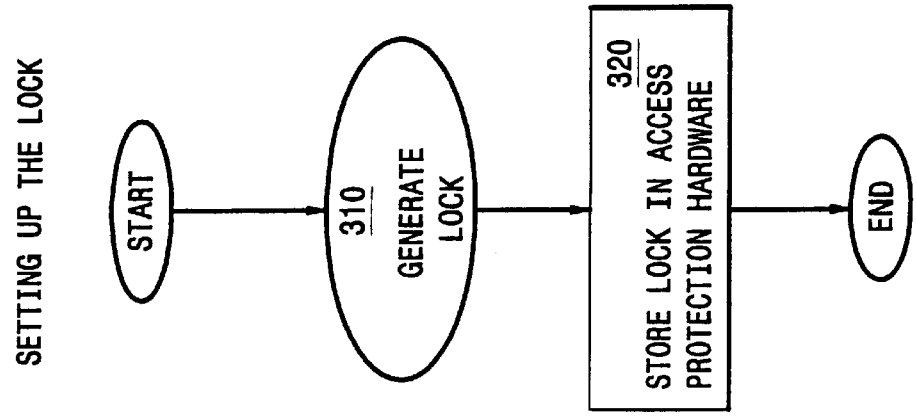

FIG. 3A and FIG. 3B show one embodiment for setting up the lock. FIG. 3A is a block diagram of the software step 310 to generate the lock and the hardware step 320 for storing the lock in access protection hardware. FIG. 3B shows that the lock 350 resides within the protection check mechanism 330 and that the protection check mechanism 330 resides within the mesh coherence unit (MCU) 340.

Access protection is maintained on a per memory page basis, where a page typically represents about 4 kilobytes of memory. If a target wishes to grant access rights of a particular page to some initiator, it manufactures a key by using the equation:

$$key = f(lock, addr)$$

where lock is the lock number, addr is the address of the page for which the key is manufactured, and f is a simple function. The key and address are then passed to the initiator.

FIG. 4A and FIG. 4B show one embodiment for granting access rights to page x for an initiator node by the target node making key x. FIG. 4A is a block diagram showing the software step 410 to manufacture the key from the lock and address and the software step 420 for sending the key to the node that is being granted access rights to page x. FIG. 4B shows how the key 430 is passed through the interconnect 450 between the mesh coherence units (MCU) 440 and 460.

When the initiator wishes to access the page, it sends the key along with the address to the target. At the target, hardware checks the access by computing a "temp" value from the incoming address and lock:

$$temp = f(lock, addr)$$

If the temp value matches the key passed with the access, then the access is allowed to proceed. Otherwise, the access is rejected.

Figure 5B:
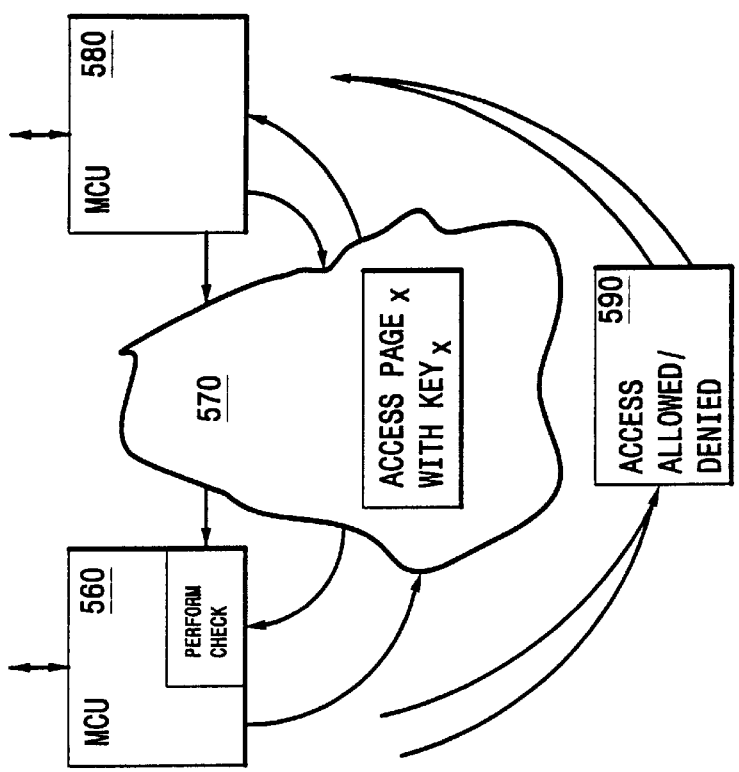
FIG. 5A and 5B show one embodiment of how access from a remote node can be made between a target and initiator node.
Figure 5A:
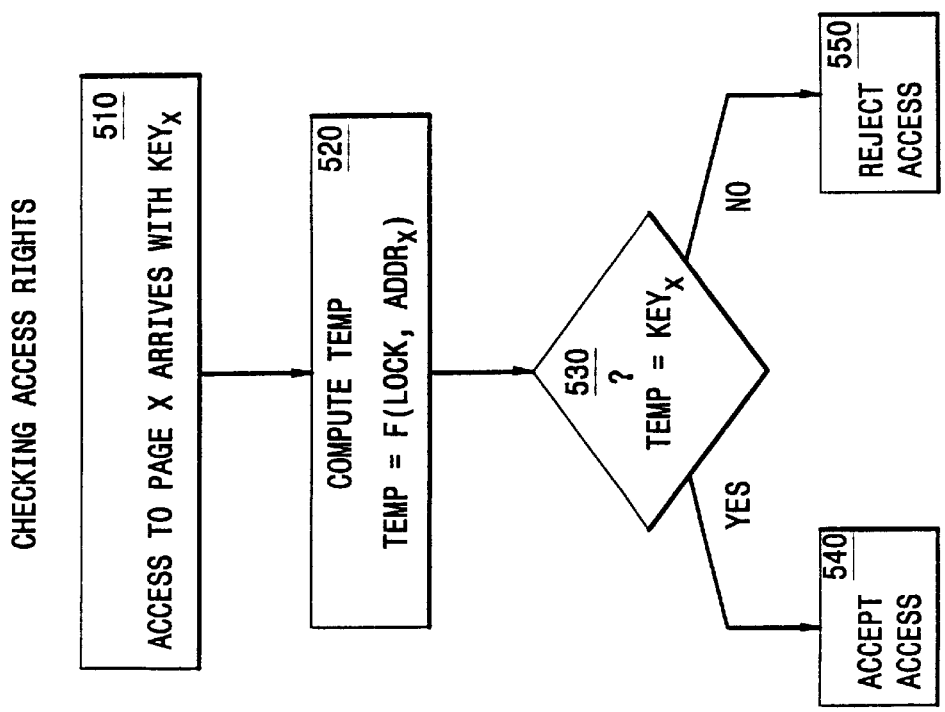

FIG. 5A and 5B show one embodiment of how access from a remote node can be made between a target and initiator node. FIG. 5A is a block diagram showing the access request to page x arrives with the key in step 510. The temp value is computed as a function of the lock and address in step 520. The temp value is compared to the key value in step 530 and if they are equal then the access request is accepted in step 540, otherwise the access request is rejected in step 550. FIG. 5B shows how the access request 590 is accepted or rejected through the interconnect 570 between the mesh coherence units (MCU) 560 and 580.

In its simplest form, function f is simply an EXCLUSIVE-OR operation. The mechanism then offers protection against accidental access to an area of memory to which access has not been granted as long as the software of the initiator only uses keys that are given to it by the target. In the case where function f is easily inverted, it is relatively easy for malicious software to generate a key that deduces the target's lock value:

$$lock=f2(key, addr)$$

Where f2 is the inverse of f, such that:

$$x=f2(f(x,y),y)$$

Thus, there exists the potential for malicious software to manufacture keys for other areas of the target's memory, and in this case, the mechanism does not provide protection.

However, by using a function f that is not easily inverted, protection against malicious software also can be achieved. For example, if $$key=mod\ (addr, lock)$$

and addr is chosen to have a sufficient quantity of bits, then it becomes very time-consuming for malicious software to calculate the lock value from a given address/key combination. Security can be maintained so long as the lock value is changed more frequently than the reverse calculation can be performed by the malicious software.

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A computer system comprising:
   an interconnection;
   a plurality of processor nodes, each node being connected to the interconnection and having a plurality of processors sharing a memory sub-system and a mesh coherence unit; and
   a lock and key mechanism having a lock value and a key value, the lock value being generated by a first processor node and stored in the mesh coherence unit of the first processor node, the key value being computable from the lock value and a memory address of the first processor node memory sub-system, the key value being provided to a second processor node to enable access by the second processor node to the memory address.

2. The computer system of claim 1 wherein
   the mesh coherence unit of the first processor node does not accept memory access requests for the lock value from other processor nodes.

3. The computer system of claim 1 wherein
   the memory address represents physical address space for a memory page within the memory sub-system.

4. The computer system of claim 1 wherein the lock and key mechanism further comprises:
   means for calculating the key value as a function of the lock value and the memory address; and
   means for providing the key value to the second processor node.

5. The computer system of claim 4 wherein the lock and key mechanism further comprises:
   means for the second processor node to request access to the memory address by providing the key value and the memory address to the first processor node, the first processor node computing a temp value from the stored lock value and the received memory address; and
   means for permitting the access request to proceed when the temp value matches the key value.

6. The computer system of claim 5 wherein the lock and key mechanism further comprises:
   means for preventing malicious software from calculating the lock value from the memory address and the key value.

7. A method for memory protection in a distributed shared memory multiprocessor system with integrated message passing, comprising:
   providing a first processor node including a processor, a shareable memory sub-system, a mesh coherence unit (MCU) and a bus for the communicative coupling thereof;
   providing a second processor node including a processor, a shareable memory sub-system, an MCU and a bus for the communicative coupling thereof;
   communicatively connecting the first processor node and the second processor node by an interconnection coupled to the MCU of the first processor node and to the MCU of the second processor node;
   the first processor node generating a lock value and storing the lock value in the MCU of the first processor node;
   the first processor node computing a key value as a function of the lock value and of a memory address, and communicating the key value and the memory address to the second processor node;
   the second processor node initiating a request for memory access by communicating to the first processor node the key value and the memory address;
   the first processor node computing a temp value as the function of the lock value and the memory address; and
   the first processor node permitting the second processor node access to the memory address if the temp value matches the key value.

8. The method of claim 7 wherein storing the lock value comprises
   storing the lock value in a portion of the MCU of the first processor node that does not accept memory access requests from other processor nodes.

9. The method of claim 7 wherein
   the first processor node computing a key value comprises calculating the key value using the equation $$key=f(lock, addr)$$

where lock is the lock value, addr is the memory address for which the key is being calculated, and f is a function for calculating the key.

10. The method of claim 7 wherein
    the first processor node computing a temp value comprises computing the temp value using the equation $$temp=f(lock, addr)$$

where lock is the stored lock value, addr is the memory address communicated by the second processor node and f is a function for computing the temp value.

11. A method for protecting memory in a multi processor-node computer system including an initiator node and a target node, comprising:

the target node generating and storing a lock value;

the target node using the lock value and a memory address of a shareable memory of the target node to calculate a key value;

the initiator node receiving the key value and the memory address;

the initiator node subsequently sending the key value and the memory address to the target node;

the target node receiving the key value and the memory address;

the target node using the received memory address and stored lock value to calculate a temp value; and the target node comparing the temp value and the received key value and granting the initiator node access rights to the shareable memory at the received memory address if the temp value matches the received key value.

12. The method of claim 11 wherein storing the lock value comprises writing the lock value to non-shareable memory.

13. The method of claim 11 wherein the address of shareable memory is associated with a page of the shareable memory.

14. The method of claim 11 wherein the address of shareable memory includes a plurality of bits.

15. The computer system of claim 6 wherein the means for preventing malicious software from calculating the lock value from the memory address and the key value further comprise:

means for regenerating the lock value after a first time period has elapsed; and means for choosing a function for computing the key value based upon the regenerated lock value such that a second time period, greater than the first time period, is needed for the second processor node to invert the function.

* * * * *